US007819530B2

(12) United States Patent   (10) Patent No.: US 7,819,530 B2
Nozaki et al.   (45) Date of Patent: Oct. 26, 2010

(54) AUXILIARY DEVICE EQUIPPED WITH PROJECTOR FOR USE WITH AN ELECTRONIC DEVICE, AND ELECTRONIC CAMERA SYSTEM INCORPORATING THE AUXILIARY DEVICE

(75) Inventors: Hirotake Nozaki, Portwashington, NY (US); Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 730 days.

(21) Appl. No.: 11/791,332

(22) PCT Filed: Nov. 25, 2005

(86) PCT No.: PCT/JP2005/021662

§ 371 (c)(1),
(2), (4) Date: May 23, 2007

(87) PCT Pub. No.: WO2006/057329

PCT Pub. Date: Jun. 1, 2006

(65) Prior Publication Data

US 2008/0049200 A1    Feb. 28, 2008

(30) Foreign Application Priority Data

Nov. 29, 2004  (JP)  .............................. 2004-343540

(51) Int. Cl.
*G03B 21/30* (2006.01)
*G03B 21/22* (2006.01)
(52) U.S. Cl. ........................................ 353/72; 353/119

(58) Field of Classification Search ................. 353/122, 353/119, 72; 348/207.2, 207.99
See application file for complete search history.

(56) References Cited

U.S. PATENT DOCUMENTS

| 6,976,180 B2* | 12/2005 | Cupps et al. ................ 713/300 |
| 2004/0130505 A1 | 7/2004 | Lee et al. |
| 2005/0280786 A1* | 12/2005 | Moiroux et al. ............. 353/119 |

FOREIGN PATENT DOCUMENTS

| JP | A 05-137039 | 6/1993 |
| JP | A 06-237403 | 8/1994 |
| JP | A 07-131689 | 5/1995 |
| JP | A 08-146512 | 6/1996 |
| JP | A 2002-171428 | 6/2002 |

* cited by examiner

*Primary Examiner*—Thanh X Luu
(74) *Attorney, Agent, or Firm*—Miles & Stockbridge P.C.

(57) ABSTRACT

An cradle 100 equipped with a projector commands the power supply to an electronic camera 200 that is mounted on the cradle 100 to be turned on and the display of a main liquid crystal display 201 to be turned off in response to an on signal from a projection switch 101. A CPU 131 (FIG. 2) is provided in the cradle 100, and the CPU 131 (FIG. 2) performs expansion processing on the image data transmitted to the cradle 100 from the electronic camera 200 if the image data is compressed. The CPU 131 (FIG. 2) of the cradle 100 performs resizing processing on the image data having been expanded according to a projection resolution of the projector unit and records the resized data in a memory card. The CPU 131 reads out the resized image data from the memory card and performs replay processing to project the image data via the projector unit.

7 Claims, 4 Drawing Sheets

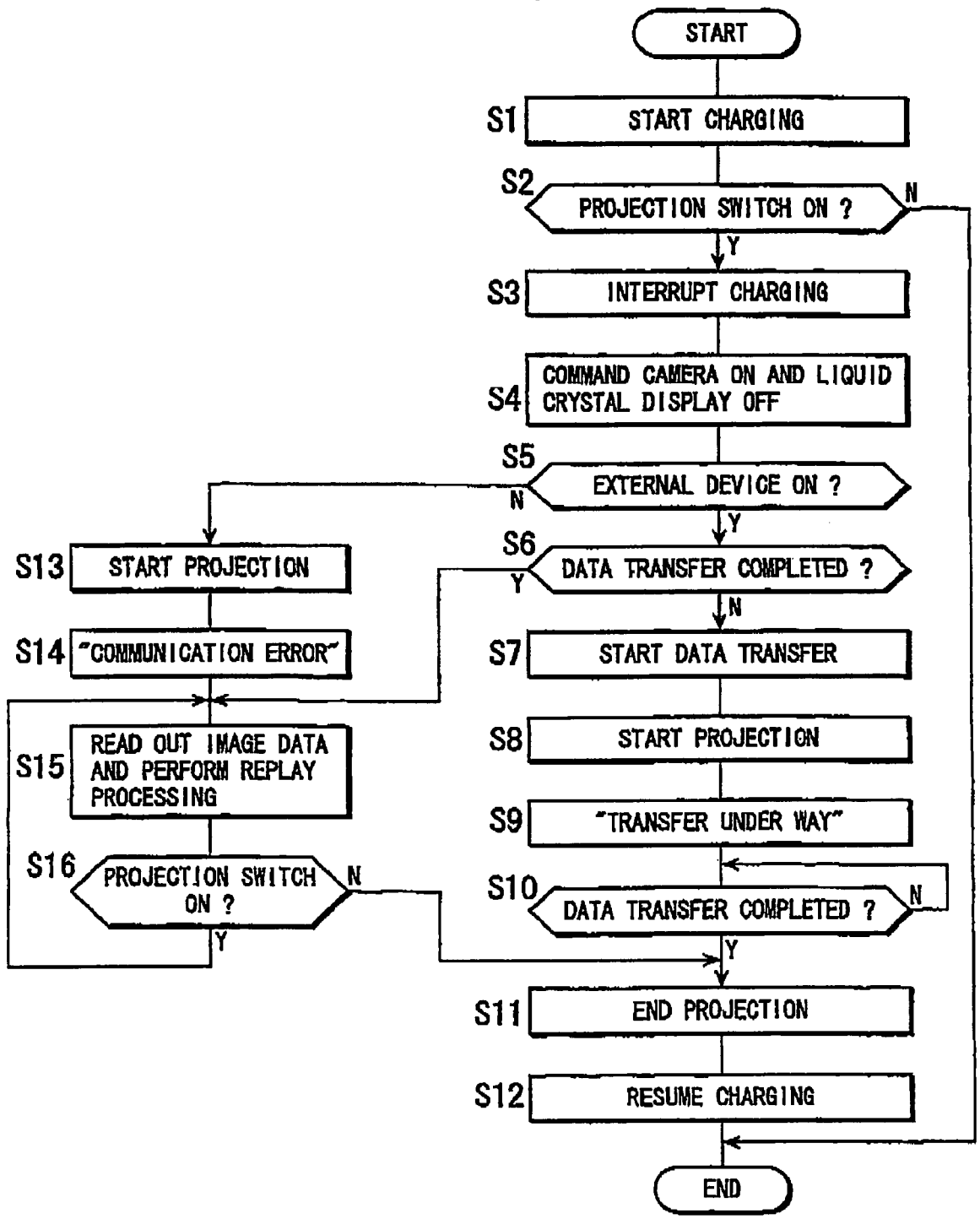

AUXILIARY DEVICE EQUIPPED WITH PROJECTOR FOR USE WITH AN ELECTRONIC DEVICE, AND ELECTRONIC CAMERA SYSTEM INCORPORATING THE AUXILIARY DEVICE

TECHNICAL FIELD

The present invention relates to an auxiliary device for an electronic device, that is used along with an electronic device such as an electronic camera or the like.

BACKGROUND ART

As an auxiliary device for an electronic device, a cradle is known that supplies electrical current for charging up an electronic device such as a portable telephone or the like powered by a rechargeable battery, and that performs communication with the electronic device. On the other hand, a projector device that projects an image or the like such as an optical image upon a screen or the like is also widely employed. The present inventors consider that, in a case in which an electronic device to be mounted in a cradle is handling images, if a structure is provided in which the cradle is endowed with a projector function, then it is convenient to be able to associate the electronic image with the projector via the cradle. At the present time, no precedent technical information has been found that affords any description in relation to such a cradle endowed with a projector function.

DISCLOSURE OF THE INVENTION

Problem to be Solved by the Invention

An auxiliary device for an electronic device equipped with a projector with a good operability is to be provided by mounting a projector to the auxiliary device for an electronic device to which an electronic device that handles electronic images is mounted, and thereby to provide

Means for Solving the Problems

An auxiliary device for an electronic device equipped with a projector according to a first aspect of the present invention includes: a device mounting section to which the electronic device is mounted; a communication unit that performs communication with the electronic device mounted in the device mounting section; a projector device that projects an image created upon an optical image formation element; and a projection control unit that controls the projector device so as to project an image that is created using a signal acquired from the electronic device via the communication unit.

According to a second aspect of the present invention, it is preferable that the auxiliary device for an electronic device equipped with a projector according to the first aspect to further include a control unit that, upon a projection command, transmits from the communication unit a signal that commands the electronic device to turn off its display unit.

According to a third aspect of the present invention, in the auxiliary device for an electronic device equipped with a projector according to the second aspect, it is preferable that the projection control unit acquires image data from the electronic device, and controls the projector device so as to project a replay image according to the acquired image data.

According to a fourth aspect of the present invention, in the auxiliary device for an electronic device equipped with a projector according to the third aspect, it is preferable that the projection control unit acquires the image data in order from a newest.

According to a fifth aspect of the present invention, it is preferable that the auxiliary device for an electronic device equipped with a projector according to the second or third aspect to further include: a resize processing unit that performs resizing processing upon the image data acquired from the electronic device, according to a projection resolution of the projector device; and a recording unit that records the image data after the resizing processing upon a recording medium.

According to a sixth aspect of the present invention, in the auxiliary device for an electronic device equipped with projector according to any one of the second to fifth aspect, it is preferable that the projection control unit controls the projector device so as to project an image that indicates a state of communication with the electronic device.

According to a seventh aspect of the present invention, the auxiliary device for an electronic device equipped with a projector according to the sixth aspect may further include an electrical power supply unit that supplies charging electrical power to the electronic device. In this case, it is preferable that the projection control unit controls the projector device so as to project an image that indicates a state of charging of the electronic device.

According to a eighth aspect of the present invention, in the auxiliary device for an electronic device equipped with a projector according to the second aspect, it is preferable that the projection control unit acquires a video signal from the electronic device, and controls the projector device so as to project a replay image according to the video signal.

An electronic camera system according to a ninth aspect of the present invention includes: an auxiliary device for an electronic device equipped with a projector according to any one of the first to eighth aspect, and an electronic camera that outputs at least one of image data that has been photographed and a video signal for replaying an image that has been photographed.

The above communication unit may be replaced with a communication means.

The above projection control unit may be replaced with a projection control means.

The above control unit may be replaced with a control means.

The above resize processing unit may be replaced with a resize processing means.

Advantageous Effect of the Invention

Since, according to the present invention, a structure is provided by which an image that has been created using a signal acquired from an electronic device that is mounted in the device mounting section is projected, therefore an auxiliary device for an electronic device equipped with a projector is obtained, of which the convenience of use is good.

Moreover since, according to another aspect of the present invention, a structure is provided by which an image that has been created using a signal acquired from an electronic camera that is mounted in the device mounting section is projected, therefore an electronic camera system is obtained, of which the convenience of use is good.

BRIEF DESCRIPTION OF THE DRAWINGS

FIG. 4 is a flow chart for explanation of the flow of a main processing program according to a second embodiment.

BEST MODE FOR CARRYING OUT THE INVENTION

In the following, preferred embodiments for implementation of the present invention will be explained with reference to the drawings.

First Embodiment

Figure 1:
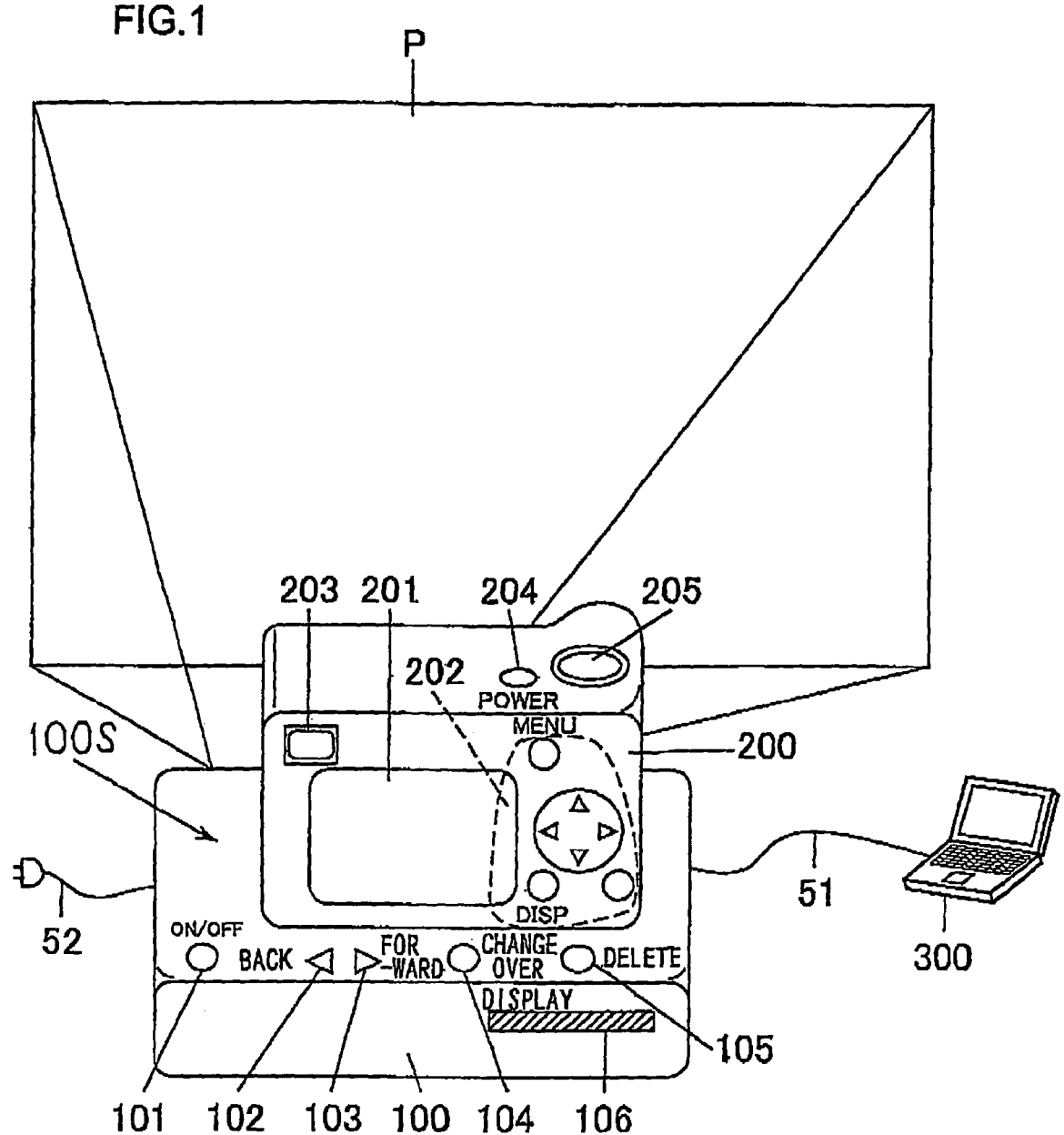
FIG. 1 is a perspective view of an electronic camera system according to a first embodiment of the present invention.

FIG. 1 is a perspective view of an electronic camera system according to a first embodiment of the present invention. In FIG. 1, an electronic camera 200 is mounted upon a cradle 100 in a device mounting section 100S, with its rear surface towards the viewer. This cradle 100 is connected to a personal computer 300 via a USB cable 51. The commercial power is supplied to the cradle 100 via a power supply cable 52.

The cradle 100 is provided with a projection switch (on/off) 101, a backward switch 102, a forward switch 103, a display changeover switch 104, a delete switch 105, a memory slot 106, and a projector projection window (not shown in the figures). A projector unit that will be described hereinafter is incorporated in the cradle 100, and this projector unit projects information such as an image or the like towards a screen or the like from the projector projection window. The reference symbol P in FIG. 1 denotes this projected image.

On the rear surface of the electronic camera 200, there are provided a main liquid crystal display unit 201, actuation members 202, and a viewfinder eyepiece window 203. The actuation members 202 include a menu button (MENU), a display button (DISP), a cruciform actuation key, and the like. On the upper surface of the electronic camera 200, there are provided a main switch (Power) and a shutter release button 205. Moreover, on the front of the electronic camera 200, there are provided a photographic lens, a viewfinder objective window, and a flash light window (none of which are shown in the figure).

Figure 2:
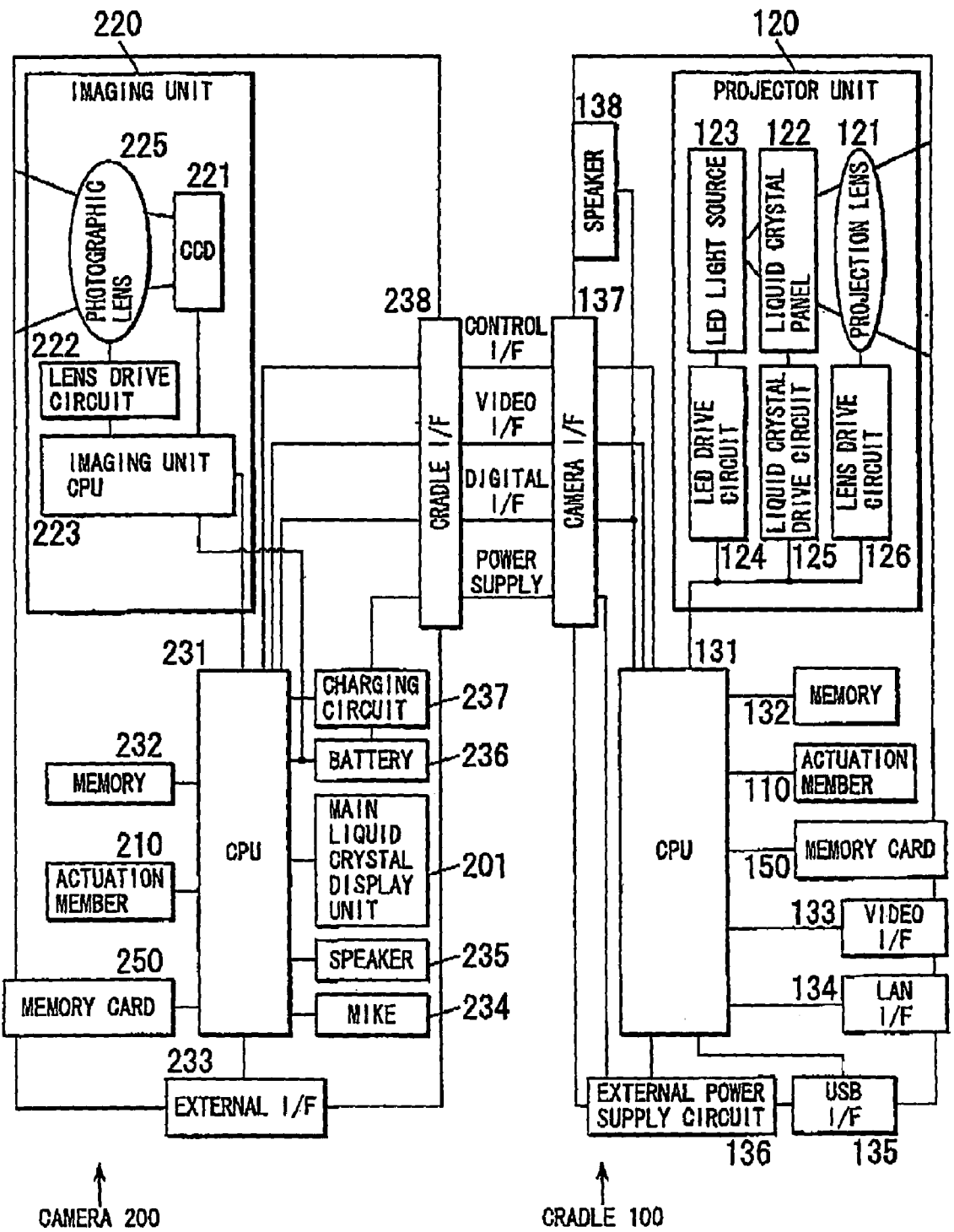
FIG. 2 is a block diagram for explanation of the electronic camera system of FIG. 1.

FIG. 2 is a block diagram for explanation of the electronic camera system of FIG. 1.

The Cradle

Referring to FIG. 2, the cradle 100 includes a projector unit 120, a CPU 131, a memory 132, actuation members 110, a video interface (VIDEO I/F) 133, a LAN interface (LAN I/F) 134, a USB interface (USB I/F) 135, an external power supply circuit 136, a camera interface 137, and a speaker 138. A removable memory card 150 is fitted in the memory slot 106 (FIG. 1). The actuation members 110 correspond to the various switches 101 through 105 described above.

Based upon a cradle control program, the CPU 131 performs control of communication operation and projector operation by performing predetermined calculations and the like using signals that are inputted from the various units of the cradle 100 and outputting control signals to the various units of the cradle 100. It should be understood that this cradle control program is stored in a non-volatile memory within the CPU 131, not shown in the figures. The CPU 131 includes a timer circuit not shown in the figures, and also performs time measurement processing for obtaining time instant information.

The memory 132 is used as a working memory for the CPU 131. The memory card 150 consists of a non-volatile memory such as a flash memory or the like, and writing and storage of data therein and reading out of data therefrom can be performed according to commands from the CPU 131.

The video interface (VIDEO I/F) 133 creates a video signal for displaying upon an external television monitor or the like a replay image according to image data or a video signal that is transmitted via the camera interface 137 when the electronic camera 200 is mounted upon the cradle 100, or a replay image according to image data that is read out from the memory card 150 when the electronic camera 200 is not mounted upon the cradle 100. By connecting such an external television monitor or the like to the video interface (VIDEO I/F) 133, this replay image is displayed upon the television monitor.

According to commands from the CPU 131, the LAN interface (LAN I/F) 134 performs transmission and reception of data to and from another external device (such as, for example, a DVD recorder/player, a monitor camera, or the like) that is connected by a LAN cable (not shown in the figures). The USB interface (USB I/F) 135 performs transmission and reception of data to and from an other external device (such as, for example, the personal computer 300, a printer, a photo data storage device, or the like) that is connected via the USB cable 51.

The external power supply circuit 136 consists of an AC/DC conversion circuit or the like, and converts AC voltage that is inputted via the power supply cable 52 to the DC voltage required by the various sections within the cradle 100, and supplies this voltage after conversion to the various blocks thereof. This external power supply circuit 136 further supplies a charge electrical current that is required for charging up the rechargeable battery within the camera 200 to the electronic camera 200 via the camera interface 137.

When the electronic camera 200 is mounted upon the cradle 100, the camera interface 137 performs data communication with the electronic camera 200 according to commands from the CPU 131, and supply of charging electrical current. In the camera interface 137, there are included a control interface line ("Control I/F") that sends and receives control signals, a video interface line ("VIDEO I/F") that sends and receives video signals, a digital interface line ("Digital I/F") that sends and receives image data and/or audio data, and a power supply line that supplies charging electrical current.

According to commands from the CPU 131, the speaker 138 replays sound due to audio data that is outputted from the CPU 131 or that is transmitted from the electronic camera 200 via the camera interface 137. The actuation members 110 output actuation signals to the CPU 131, corresponding to the various switches as they are actuated.

The projector unit 120 includes a projection lens 121, a liquid crystal panel 122, a LED light source 123, a LED drive circuit 124, a liquid crystal drive circuit 125, and a lens drive circuit 126. The LED drive circuit 124 supplies electrical current to the LED light source 123 according to a LED drive signal that is outputted from the CPU 131. And the LED light source 123 illuminates the liquid crystal panel 122 with a brightness corresponding to the electrical current that is supplied.

The liquid crystal drive circuit 125 creates a liquid crystal panel drive signal according to image data that is outputted from the CPU 131, and drives the liquid crystal panel 122 with this drive signal that it has created. In concrete terms, it applies a voltage corresponding to the image signal to each picture element in the liquid crystal layer. The arrangement of the liquid crystal molecules in this liquid crystal layer to which voltage has been applied changes so as to change the transitivity for light of the liquid crystal layer. By modulating the light from the LED light source 123 in this manner according to the image signal, the liquid crystal panel 122 generates an optical image.

The lens drive circuit 126 drives the projection lens 121 forwards and backwards along a direction that is orthogonal to its optical axis, according to a control signal that is outputted from the CPU 131. The projection lens 121 projects the optical image that is emitted from the liquid crystal panel 122 upon a screen or the like. The projection unit 120 starts projection when an actuation signal for starting projection is inputted to the CPU 131 from the actuation members 110, and, according to this actuation signal, the projector unit 120 receives a projection command that is outputted by the CPU 131.

According to commands from the CPU 131, the projection unit 120 projects an image that corresponds to any one of (1) through (4) described below. Each time the actuation signal from the display changeover switch 104 is inputted, the CPU 131 issues a changeover command to the projector unit 120 to change over the projected image of (1) through (4) cyclically in order through (1)→(2)→(3)→(4)→(1).... However, if the electronic camera 200 is not mounted upon the cradle 100 then (1) and (2) are skipped; and, if no memory card 150 is loaded into the cradle 100, then (3) is skipped.

(1) A replay image according to image data that is transmitted from the electronic camera 200 via the digital interface line ("Digital I/F") of the camera interface 137;

(2) A replay image according to a video signal that is transmitted from the electronic camera 200 via the video interface line ("VIDEO I/F") of the camera interface 137;

(3) A replay image according to image data that is recorded in the memory card 150;

(4) A time instant display image that shows the time measured by the CPU 131.

When projecting an image that corresponds to (1) described above through the cradle 100, the CPU 131 performs expansion processing if the image data received from the electronic camera 200 is compressed, and also resizing processing to generate a reduced size image from the image data. This resizing processing is processing for creation of reduced size image data whose data size is smaller than that of the image data that has been received, corresponding to the projection resolution of the projector unit 120 (that is the number of picture elements that make up the liquid crystal panel 122, for example 640×480 dots). The liquid crystal drive circuit 125 creates a liquid crystal panel drive signal using this reduced size image data after resizing. And, when the reduced size image data has been generated, the CPU 131 stores this reduced size image data in the memory card 150.

The image data that the cradle 100 has received from the electronic camera 200 is adapted to be capable of being transferred to an external device (for example a DVD recorder/player or a monitor camera or the like) that is connected via the LAN interface (LAN I/F) 134, or to another external device (for example the personal computer 300, a printer, a photo data storage device, or the like) that is connected via the USB interface (USB I/F) 135. When transferring this image data, based upon the details that are set in advance with an actuation menu or the like, the image data received by the cradle 100 may be transmitted just as it is, or reduced size image data may be transmitted after resizing processing such as described above. Due to this structure, it is possible to copy image data from the electronic camera 200 via the cradle 100 to another electronic device.

When projecting an image that corresponds to (2) described above through the cradle 100, the CPU 131 creates projection image data that corresponds to the projection resolution of the projector unit 120, using that video signal. And the liquid crystal drive circuit 125 creates a liquid crystal panel drive signal using this projection image data that has been created. The video signal described above corresponds to the contents that is displayed upon the main liquid crystal display unit 201 of the electronic camera 200, and may be a photographic image, may be a menu setting screen, or may be a display that specifies the operational state of the electronic camera 200.

When projecting an image that corresponds to (3) described above from the cradle 100, the CPU 131 reads out from the memory card 150 the reduced size image data whose date and time of recording is the most recent (i.e., among the recorded image data, the image data that has been photographed last). And the liquid crystal drive circuit 125 creates the liquid crystal panel drive signal using this reduced size image data that has been read out from the memory card 150.

When an actuation signal is inputted from the backward switch 102 in the state in which an image corresponding to (3) described above is being projected, then the CPU 131 reads out from the memory card 150 the reduced size image data for one frame earlier than the image that is currently being projected. And the liquid crystal drive circuit 125 creates a liquid crystal panel drive signal based upon this reduced size image data that has newly been read out from the memory card 150. By doing this, instead of the image that is being currently projected, the image one frame before is now projected by the projector unit 120.

And, when an actuation signal is inputted from the forward switch 103 in the state in which an image corresponding to (3) described above is being projected, then the CPU 131 reads out from the memory card 150 the reduced size image data for one frame later than the image that is currently being projected. And the liquid crystal drive circuit 125 creates a liquid crystal panel drive signal based upon this reduced size image data that has newly been read out from the memory card 150. By doing this, instead of the image that is being currently projected, the image one frame later is now projected by the projector unit 120.

Moreover, when an actuation signal is inputted from the delete switch 105 in the state in which an image corresponding to (3) described above is being projected, then the CPU 131, along with deleting the reduced size image data that corresponding to the image that is being projected from the memory card 150, also reads out from the memory card 150 the reduced size image data for one frame earlier than the deleted data. And the liquid crystal drive circuit 125 creates a liquid crystal panel drive signal based upon this reduced size image data that has newly been read out from the memory card 150. By doing this, along with deleting the data corresponding to the image that is being projected, the image one frame earlier is now projected by the projector unit 120.

And, when projecting an image that corresponds to (4) described above from the cradle 100, the CPU 131 creates projection image data that shows the current time instant, using the timing information provided by the timer circuit. And the liquid crystal drive circuit 125 creates a liquid crystal panel drive signal based upon this projection image data that has been created.

The Electronic Camera

Referring to FIG. 2, the electronic camera 200 includes an imaging unit 220, a CPU 231, a memory 232, actuation members 210, an external interface (I/F) 233, a mike 234, a speaker 235, the main liquid crystal display unit 201, a battery 236, a charging circuit 237, and a cradle interface 238. A memory card 250 that can be fitted to and removed from a memory slot not shown in the figures is also provided. Apart from the actuation member 202 upon the rear surface described previously, the actuation members 210 also include the main switch (Power) and the release button 205 upon the upper surface.

Based upon a camera control program, the CPU 231 performs predetermined calculations or the like using signals that are inputted from the various sections that make up the electronic camera 200, and performs control of the operation of the camera by outputting control signals to the various sections of the electronic camera 200. It should be understood that this camera control program is stored in a non-volatile memory within the CPU 231, not shown in the figures.

The memory 232 is used as a working memory for the CPU 231. The memory card 250 consists of a non-volatile memory such as a flash memory or the like, and, upon commands from the CPU 231, data can be written thereto, stored therein, and read out therefrom.

Upon command from the CPU 231, the external interface (I/F) 233 performs sending and receipt of data to and from another external device (for example a printer or a photo data storage device or the like) that is connected via an interface cable (not shown in the figures).

Upon command from the CPU 231, the mike 234 converts audio that it has captured into an electrical signal and outputs it to the CPU 231. This audio signal data is recorded upon the memory card 250 during sound recording. And, upon command from the CPU 231, the speaker 235 replays audio according to audio data that is outputted from the CPU 231. The actuation members 210 output actuation signals to the CPU 231 in correspondence to the switches thereof which are actuated.

The main liquid crystal display unit 201 displays information such as an image or text or the like, upon command from the CPU 231. This text information may be the operational state of the electronic camera 200, the contents of an actuation menu, or the like.

The battery 236 consists of a rechargeable battery, and supplies the electrical power that is required by the various sections within the electronic camera 200. And the charging circuit 237 charges up the battery 236 with a charging electrical current that is supplied from the cradle 100 via the cradle interface 238.

When this electronic camera 200 is mounted upon the cradle 100, the cradle interface 238 performs data communication with the cradle 100 and reception of charging electrical current. In this cradle interface 238, there are included a control interface line ("Control I/F") that sends and receives control signals, a video interface line ("VIDEO I/F") that sends and receives video signals, a digital interface line ("Digital I/F") that sends and receives image data and/or audio data, and a power supply line that supplies charging electrical current.

The imaging unit 220 includes a photographic lens 225, an image sensor 221, a lens drive circuit 222, and an imaging unit control CPU 223. A CCD or a CMOS image sensor or the like may be used as the image sensor 221. The imaging unit control CPU 223, along with drive controlling the image sensor 221 and the lens drive circuit 222 according to commands from the CPU 231, also performs predetermined image processing upon the image capture signals (the accumulated electric charge signals) that are outputted from the image sensor 221. This image processing is white balance processing and gamma processing and the like.

And, upon receipt of a zoom control signal from the imaging unit control CPU 223, the lens drive circuit 222 drives a zoom lens (not shown in the figures) that is incorporated in the photographic lens 225 to a tele side or a wide side, according to the control signal. The photographic lens 225 forms an image of the photographic subject to be imaged upon the image-capturing surface of the image sensor 221. And the imaging unit control CPU 223 controls the image sensor 221 to start capturing an image. After this image capture has ended, the imaging unit control CPU 223 reads out the accumulated electric charge signals from the image sensor 221, and outputs them as image data to the CPU 231 after having performed the above described image processing thereupon.

It is arranged to be possible for the image data that has been inputted to the CPU 231 to be recorded upon the memory card 250, and/or to be transmitted to the cradle 100 via the cradle interface 238. It should be understood that it is also possible for the audio data that has been captured by the mike 234 to be recorded upon the memory card 250 together with the image data, or to be transmitted to the cradle 100 via the cradle interface 238.

Since the present invention is particularly distinguished by the operation of the above described electronic camera system on the cradle side, accordingly the explanation will focus upon the control of the cradle 100.

Figure 3:
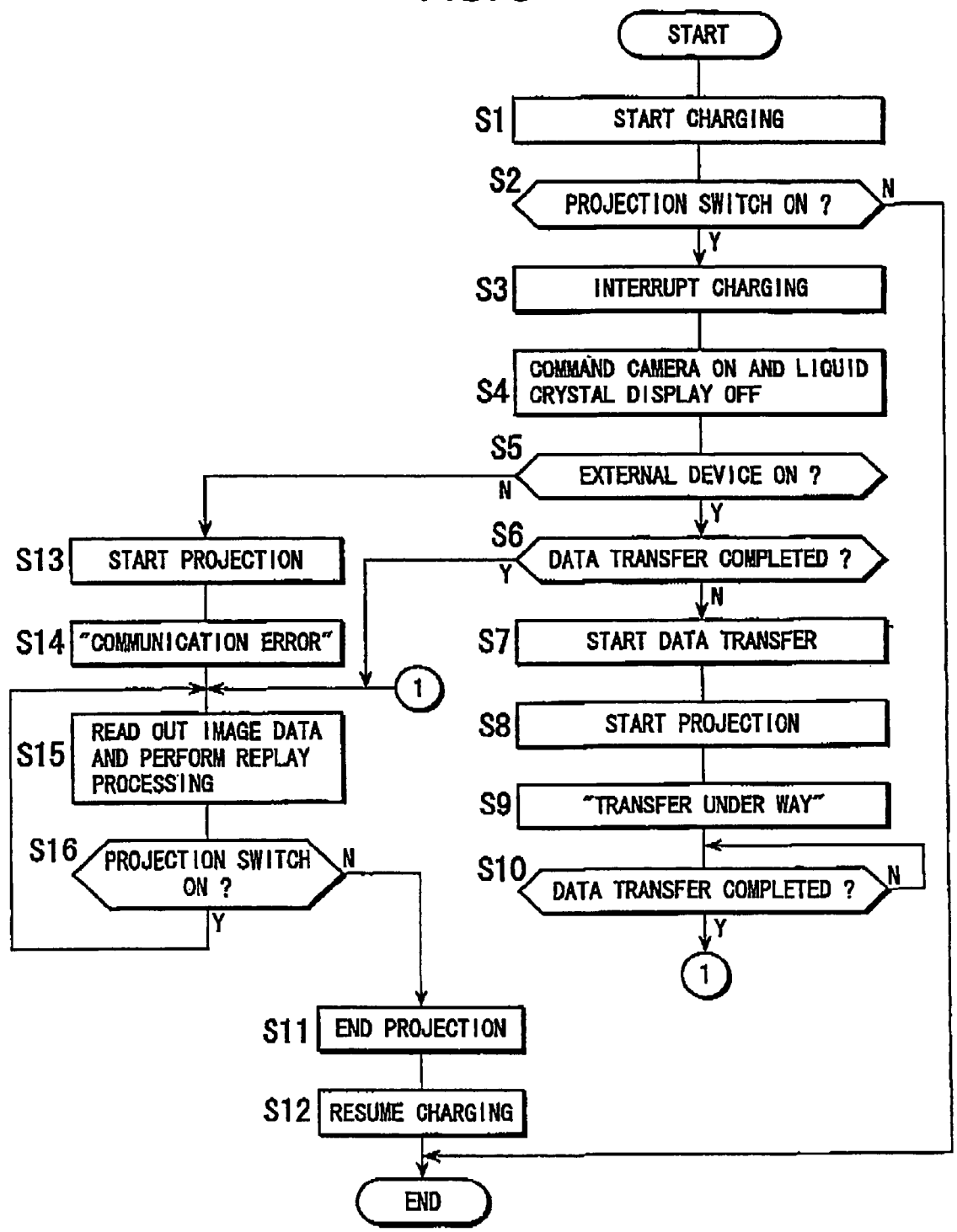
FIG. 3 is a flow chart for explanation of the flow of a main processing program that is executed by a CPU of a cradle.

FIG. 3 is a flow chart for explanation of the flow of the main processing program that is executed by the CPU 131 of the cradle 100. The processing in FIG. 3 is started when a predetermined power supply voltage is applied to the CPU 131 of the cradle 100 and the electronic camera 200 is mounted upon the cradle 100. The system is constructed so that, when the electronic camera 200 is mounted upon the cradle 100, the cradle interface 238 and the camera interface 137 are directly connected together. The CPU 131 may, for example, detect the signal level upon some predetermined terminal within the camera interface 137 at predetermined time intervals so as to determine whether the electronic camera 200 is mounted or not based upon this detected value.

In a step S1 of FIG. 3, the CPU 131 sends a command to the external power supply circuit 136 to start the supply of charging electrical current to the electronic camera 200, and then the flow of control proceeds to a step S2. Due to this, if the battery voltage of the battery 236 is less than some predetermined value, then charging up of the battery 236 is performed.

In this step S2, the CPU 131 decides whether or not the projection switch is ON. If an actuation signal has been inputted from the projection switch (on/off) 101, then the CPU 131 makes an affirmative decision in the step S2 and proceeds to a step S3, while, if no actuation signal is being inputted, then the CPU 131 makes a negative decision in this step S2 and the processing of FIG. 3 is terminated. The cradle 100 is adapted to terminate the supply of charging electrical current automatically, when the battery voltage of the battery 236 of the electronic camera 200 reaches a predetermined value.

In the step S3, the CPU sends a command to the external power supply circuit 136 and interrupts the supply of charging electrical current to the electronic camera 200, and then the flow of control proceeds to a step S4.

In this step S4, the CPU 131 commands the electronic camera 200 to perform power supply ON processing and to turn the liquid crystal display OFF, and then the flow of control proceeds to a step S5. In concrete terms, an ON-command signal is transmitted to the electronic camera 200 via the control interface line ("Control I/F"). And the CPU 231 of the electronic camera 200 is adapted to perform power supply ON processing for the electronic camera 200, according to this ON command signal. Since, along with the ON command signal described above, the CPU 131 further transmits a signal that commands the display of the main display unit 201 to be turned OFF, accordingly the electronic camera 200 puts the display of the main display unit 201 into the OFF state immediately after the power supply ON processing.

In the step S5, the CPU 131 decides whether or not the power supply of an external device that is connected to the cradle 100 is turned ON. If the power supply of an external device that is connected via the LAN interface (LAN I/F) 134, or the power supply of an external device that is connected via the USB interface (USB I/F) 135, is turned ON, then the CPU 131 makes an affirmative decision in the step S5 and the flow of control proceeds to a step S6. If the power supply of an external device is not on (including the case in which no external device is connected) then the CPU 131 makes a negative decision in the step S5 and the flow of control proceeds to a step S13. This decision as to whether the power supply is ON or OFF (including non-connection) is performed by communicating (i.e. attempting communication) via the LAN interface (LAN I/F) 134 or via the USB interface (USB I/F) 135, based upon a predetermined protocol. If communication is effective then it is decided that the power supply is ON, whereas if communication cannot be established then it is decided that the power supply is OFF.

In the step S6, the CPU 131 decides whether or not transfer of the image data that is recorded within the electronic camera 200 to the exterior device has been completed. The CPU 131, for example, refers to an image data transfer management table to decide whether or not the transfer of the image data has been completed. If it is decided that transfer has been completed, then the CPU 131 reaches an affirmative decision in this step S6, and the flow of control proceeds to a step S15. But if the CPU 131 decides that transfer is not yet completed, then it reaches a negative decision in this step S6, and the flow of control proceeds to a step S7. It could be arranged for this image data transfer management table to be stored within the memory 132 of the cradle 100, or for it to be stored in a data storage device within the external device.

In the step S7, the CPU 131 starts data transfer to the external device that is connected, and then the flow of control proceeds to a step S8. In concrete terms, along with reading out the non-transferred image data from the memory card 250 of the electronic camera 200 and recording it in the memory 132, the image data that has been recorded in the memory 132 is sent to the external device. In this data transfer, among the image data recorded in the memory card 250, the transfer is performed in order from the image that has been photographed most recently (i.e. whose recording date and time are the newest). Further, the CPU 131 performs expansion processing if the image data that has been recorded in the memory 132 has been subjected to compression processing, then performs resizing processing upon the image data after expansion processing corresponding to the projection resolution of the projector unit 120, and then records the data after resizing in the memory card 150. If the recording region in the memory card 150 is insufficient, then, if and only if the recording date and time of the image data recorded in the memory card 250 of the electronic camera 200 are later than the recording date and time of the image data that is recorded upon the memory card 150, this newer image data is recorded in the memory card 150 and the old image data is deleted, so that overwriting (updating) recording with the new image data that has been read out from the memory card 250 of the electronic camera 200 is performed. By doing this, on the one hand the resized image data having the later date and time of photography is recorded, while on the other hand the resized image data is deleted from that having the earliest date and time of photography onwards.

In the step S8 the CPU commands the projector unit 120 to start projection, and then the flow of control proceeds to a step S9. Due to this, the LED drive circuit 124 turns ON the LED light source 123. And in the step S9 the CPU 131 commands the projector unit 120 to project "transfer under way", and then the flow of control proceeds to a step S10. Due to this, the display "transfer under way" that indicates the state of communication is displayed upon the liquid crystal drive panel 122 by the liquid crystal drive circuit 125.

In the step S10 the CPU 131 decides whether or not the transfer of the image data has been completed. If all of the image data that was decided in the step S6 as not yet transferred have now been transferred to the external device, then the CPU 131 makes an affirmative decision in the step S10 and the flow of control is transferred to a step S15, while if some non-transferred data still remains, then a negative decision is made in this step S10 and the above decision processing is repeated.

In the step S13, the CPU 131 commands the projector unit 120 to start projection, and then the flow of control proceeds to a step S14. Due to this, the LED drive circuit 124 turns ON the LED light source 123. And in the step S14 the CPU 131 commands the projector unit 120 to project "communication error", and then the flow of control proceeds to a step S15. Due to this, the display "communication error" that indicates the state of communication is displayed upon the liquid crystal drive panel 122 by the liquid crystal drive circuit 125. "Communication error" corresponds to communication having become ineffective.

In the step S15, the CPU 131 reads out the image data after resizing recorded in the memory card 150, and performs replay processing. In this replay processing, based upon the details that are set in advance with an actuation menu or the like, the image data may be read out so as to change over the image projected by the cradle 100 automatically at predetermined intervals (in a so called slide show), or the image data may be read out so as to change over the projected image in response to actuation signals from the backward switch 102 and the forward switch 103. The image data that is read out by the CPU 131 is sent to the liquid crystal drive circuit 125 of the projector unit 120. Furthermore, if an actuation signal has been inputted from the display changeover switch 104, then the CPU 131 issues changeover commands to the projection unit 120 so as to change over the projected images described in (1) through (4) above cyclically, in correspondence to the actuation signal. It should be understood that the image projected by the step S15 corresponds to the case (3) described above.

In a step S16, the CPU 131 decides whether or not the projection switch is ON. If the actuation signal from the projection switch (on/off) 101 is being continuously inputted, then the CPU 131 makes an affirmative decision in the step S16 and returns to the step S15, while if the actuation signal is not being inputted, then a negative decision is reached in the step S16, and the flow of control is transferred to a step S11.

In this step S11 the CPU 131 commands the projector unit 120 to terminate projection, and then the flow of control proceeds to a step S12. Due to this, the LED drive circuit 124 turns OFF the LED light source 123.

In the step S12 the CPU 131 issues a command to the external power supply circuit 136 and resumes the supply of charging electrical current to the electronic camera 200, and then the processing of the FIG. 3 flow chart terminates. Due to this, the battery 236 of the electronic camera 200 is charged up, until the battery voltage of the battery 236 reaches a predetermined value.

According to the first embodiment described above, the following operations and advantages can be obtained.

(a) According to an ON signal from the projection switch (on/off) 101 (i.e. an affirmative decision in the step S2), the cradle 100 that is equipped with the projector unit 120 commands the power supply to the electronic camera 200 that is mounted in the cradle 200 to be turned ON and the display of its main liquid crystal display unit 201 to be turned OFF (in the step S4). Thus, when projection is to be performed, not only is the labor for turning the power supply to the electronic camera 200 ON saved, but also the display by the main liquid crystal display unit 201 is turned OFF. Accordingly it is possible to reduce the amount of electrical power that is consumed by the electronic camera 200.

(b) The CPU 131 is provided in the cradle 100, and it is arranged for expansion processing to be performed by this CPU 131, if the image data that is transmitted from the electronic camera 200 to the cradle 100 is compressed. Due to this, the cradle 100 is enabled to handle the image data, irrespective of whether or not the image data is compressed.

(c) The CPU 131 of the cradle 100 performs resizing processing upon the image data that has been subjected to expansion processing in the above stage (b), according to the projection resolution of the projector unit 120, and records the data after resizing in the memory card 150. And the CPU 131 reads out this image data after resizing from the memory card 150 and performs replay processing for the image data to project it via the projector unit 120. Since the recording capacity of the memory card 150 may be kept to the necessary minimum according to the projection resolution of the projector unit 120, accordingly the beneficial effect is obtained of economizing the capacity of the memory card 150 that is used.

(d) The CPU 131 of the cradle 100 transfers the image data from the electronic camera 200 via the cradle 100 to the external device (in the step S7), and, when the transfer ends (an affirmative decision in the step S10) reads out the image data after resizing that has been recorded in the memory card 150 in the step (c) described above and performs replay processing for the image data to project the replay image with the projector unit 120 (in the step S15). When the transfer ends, by the image being projected automatically, the viewer is able to check the contents of the transfer by observing the large image that is projected.

(e) The CPU 131 reads out the image data that is recorded upon the memory card 150 and performs replay processing thereupon, and, in the state in which the replay image is being projected with the projector unit 120 (in the step S15), the projected image can be cyclically changed over according to (1) through (4) as described above in correspondence to the actuation signal from the display changeover switch 104. Due to this, it is possible to project the replay image with the projector unit 120, irrespective of the data format and the signal format of the image that is inputted from the electronic camera 200 to the cradle 100.

(f) When an image corresponding to (2) above is being projected in correspondence to the actuation signal from the display changeover switch 104, the video signal that is created by the CPU 231 of the electronic camera 200 is transmitted from the electronic camera 200 to the cradle 100 via the video interface line ("VIDEO I/F"), and the projector unit projects a replay image according to this video signal. Due to this, since normally it is possible to project the image that is displayed upon the main liquid crystal display unit 201 of the electronic camera 200 via the projector unit 120 in a larger form, accordingly the viewer is able to observe, upon the screen, an image that is larger than that on the liquid crystal display unit 201.

In the above explanation, it was arranged for the image data transmitted from the electronic camera 200 to the cradle 100 to be recorded upon the memory card 150, and for the CPU 131 to read out the replay image from the memory card 150 and to perform replay processing thereupon, and then to project this image via the projector unit 120 (in the step S15). However, instead of transmitting the image data from the electronic camera 200 to the cradle 100, it would also be acceptable to arrange for the memory card 250, upon which the image data has been recorded by the electronic camera 200, to be directly loaded into the memory slot 106 of the cradle 100, and for the CPU 131 to read out the replay image directly from the memory card 250 and to perform replay processing thereupon, and then to project this image via the projector unit 120.

Moreover, with regard to the projection in the step S9 of "transfer under way", it would also be acceptable to arrange to specify the state of the transfer in more detail. For example, "camera cradle" or "cradle external device" (in this example, a personal computer) may be projected. Furthermore, it would also be acceptable to arrange to display the state of progress from the start of the transfer to the end of the transfer with a bar graph.

In the step S15, when performing projection in the slide show format, the projection was performed by reading out (acquiring) images, among the image data recorded upon the memory card 150, in order from the one that was photographed first (i.e. whose date and time of recording is the oldest). Instead of this, it would also be acceptable to arrange to acquire and to project images in order from the one that was photographed last (i.e. whose date and time of recording is the newest).

Although it was made to be possible to change over the projected image cyclically in correspondence to (1) through (4) as described above according to the actuation signal from the display change over switch 104, it would also be acceptable additionally to project (5) a charging display image that indicates the state of charge of the camera battery 236. The CPU 131 then would change over the projected image cyclically in correspondence to (1) through (5) as described above according to the actuation signal from the display changeover switch 104. It would be acceptable to arrange for data that indicates this state of charge to be received from the electronic camera 200 via the control interface line ("Control I/F") ; or it would also be acceptable to arrange for this data to be generated by the CPU 131 based upon change of the charging electrical current from the external power supply circuit 136.

The CPU 131 of the cradle 100 is arranged to perform resizing processing upon the image data that has been subjected to expansion processing according to the projection resolution of the projector unit 120, and to record the data in the memory card 150 after it has thus been resized. Instead of a removable recording medium like the memory card 150, it would also be acceptable to arrange to record the data after resizing processing upon a flash memory or a hard disk drive that is fixed within the cradle 100 (i.e. that is mounted upon its circuit board or in its casing).

Apart from the external device being the personal computer 300 described above, a printer, a DVD recorder/player, a monitor camera, or a photo data storage device, it would also be acceptable to arrange to connect a hard disk drive (HDD), a CD-R/RW device, a MD recording and replay device, a MO recording and replay device, a television device, a FDA, a portable telephone device, a digital album device, a digital photo stand, a door phone, or the like.

Second Embodiment

It would also be acceptable, after the decision upon the end of data transfer in the step S10 of FIG. 3, not to perform image projection, but instead to resume charging. FIG. 4 is a flow chart for explanation of the flow of a main processing program according to a second embodiment. The processing of this FIG. 4 is performed instead of the processing of FIG. 3.

Since the feature by which FIG. 4 differs, as compared to FIG. 3, is that after an affirmative decision in the step S10 the flow of control is transferred to the step S11, accordingly the explanation will focus upon this point of difference. If, in the step S10, all of the image data that it was decided in the step S9 was not transferred has now been transferred to the external device, then the CPU 131 reaches an affirmative decision in this step S10, and the flow of control proceeds to the step S11. If some non-transferred data still is present, then a negative decision is reached in the step 310 and this decision processing is repeated.

In this step S11, the CPU 131 commands the projector unit 120 to terminate projection, and then the flow of control proceeds to the step S12. Due to this, the LED drive circuit 124 turns the LED light source 123 OFF.

According to the second embodiment as explained above, the CPU 131 of the cradle 100 transfers the image data from the electronic camera 200 to the external device via the cradle 100 (in the step S7), and when the transfer is completed (an affirmative decision in the step S10), the charging that was interrupted in the step S3 is resumed (in the step S12) and the processing of FIG. 4 is terminated. Due to this, when confirmation of the details of the transfer is not required, then it is possible to resume the charging immediately after termination of the transfer.

Although it is arranged for the detection that the electronic camera 200 is mounted upon the device mounting section 100S of the cradle 100 is performed by detecting the signal level upon a predetermined terminal within the camera interface 137, it would also be acceptable to perform this detection magnetically by utilizing a magnet or the like.

An example has been explained in which the electronic camera 200 is directly mounted upon the device mounting section 100S of the cradle 100, and in which the cradle interface 238 and the camera interface 137 are physically connected together. Instead of this, it would also be acceptable to arrange to provide a structure in which, even though the electronic camera 200 is not directly mounted upon the device mounting section 100S, transmission and reception of signals and transmission and reception of charging electrical power between the electronic camera 200 and the cradle 100 is performed by wireless communication.

If a projector unit is also provided to the electronic camera 200, then it will be acceptable to perform projection with this projector unit on the electronic camera 200, provided that the resolution of the projector unit on the electronic camera 200 is higher than the resolution of the projector unit on the cradle 100. In this case, projection with the projector unit 120 on the cradle 100 is not performed. Resolution information about the projector units is exchanged by communication between the CPU 231 (of the electronic camera 200) and the CPU 131 (of the cradle 100).

Although, as an example of the structure of the projector unit 120, it was explained that an optical image formation element was constructed using the liquid crystal panel 122, and an optical image was obtained by illuminating the image upon the liquid crystal panel 122 with the light of the LED light source 123, it would also be acceptable to arrange to provide a structure using an light-emitting type optical image formation element. In this case, the optical image formation element is constructed by arraying point light sources corresponding to the picture elements, and this optical image formation element creates an optical image by causing light of luminance corresponding to the image signal to be emitted by each of these picture elements.

Although in the above description, by way of example, an electronic camera 200 has been explained as an electronic device that handles images, the present invention could also be applied to a portable telephone unit that transmits and receives electronic data, or to a PDA, a photo data storage device, or the like.

Thus, although in the above explanation various embodiments and variant embodiments have been described, the present invention is not to be considered as being limited by these particular details. Other modes are also to be considered as being included within the range of the present invention, provided that they are considered as being within the range of the technical concept of the present invention.

The contents of the disclosure of the following patent application, upon which priority is claimed, are hereby incorporated by reference:

Japanese Patent Application 2004-343540 (filed on 29 Nov. 2004).

The invention claimed is:

1. An auxiliary device for an electronic device, comprising:
   a device mounting section to which the electronic device is mounted;
   a communication unit that performs communication with the electronic device mounted in the device mounting section;
   a projector device that projects an image created upon an optical image formation element;
   a projection control unit that acquires image data from the electronic device via the communication unit, and controls the projector device so as to project an image according to the acquired image data;
   an operating unit that operates the projector device, and that is disposed, with respect to the electronic device mounted upon the device mounting section, on a side opposite to a direction of projection;
   a resize processing unit that performs resizing processing of the image data acquired from the electronic device, according to a projection resolution of the projector device; and
   a recording unit that records the image data after the resizing processing in a recording medium.

2. An auxiliary device for an electronic device according to claim 1, further comprising:
   a control unit that, upon a projection command, transmits from the communication unit a signal that commands the electronic device to turn off its display unit.

3. An auxiliary device for an electronic device according to claim 1, wherein:
   the projection control unit acquires the image data in an order beginning with the image data that has been most recently recorded on the electronic device.

4. An auxiliary device for an electronic device according to claim 2, wherein:
   the projection control unit controls the projector device so as to project an image that indicates a state of communication with the electronic device.

5. An auxiliary device for an electronic device according to claim 4, further comprising:

an electrical power supply unit that supplies charging electrical power to the electronic device;

wherein the projection control unit controls the projector device so as to project an image that indicates a state of charging of the electronic device.

6. An auxiliary device for an electronic device according to claim 2, wherein:

the projection control unit acquires a video signal from the electronic device, and controls the projector device so as to project a replay image according to the video signal.

7. An electronic camera system, comprising:

an auxiliary device for an electronic device according to claim 1, and an electronic camera that outputs at least one of image data that has been photographed and a video signal for replaying an image that has been photographed.

* * * * *